O. Lehmann,
Steam Engine Indicator.
No. 113,068.  Patented Mar. 28, 1871.
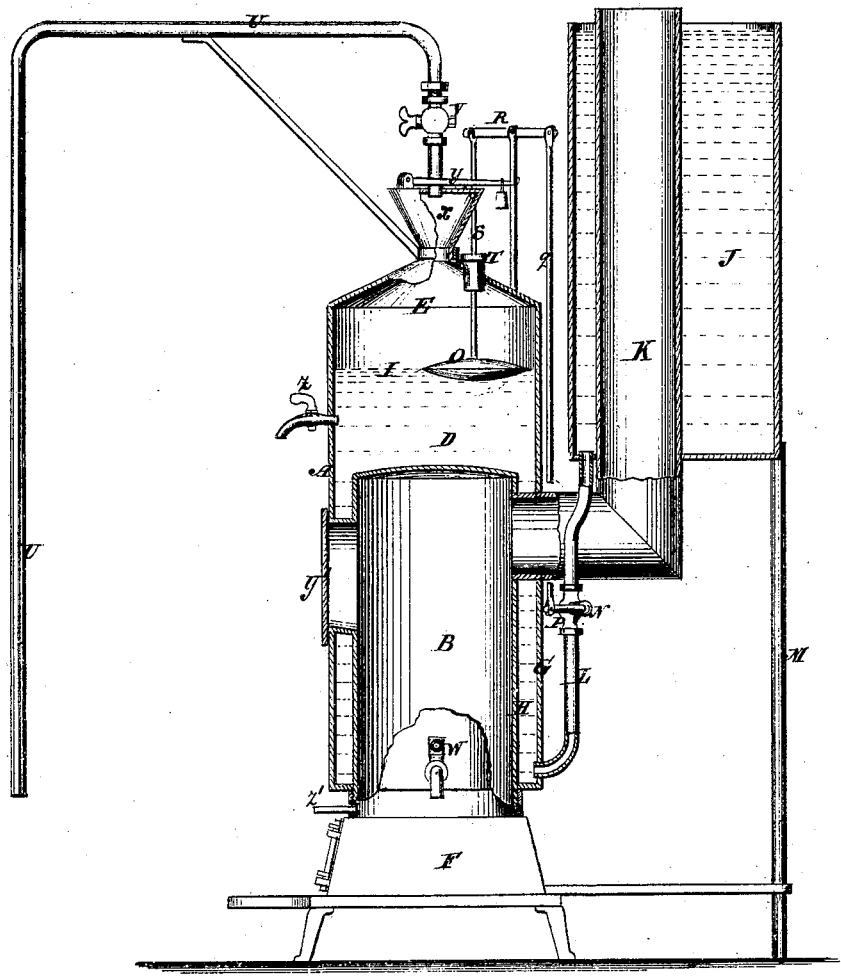
Witnesses:
L. S. Mabee
Alex F. Roberts
Inventor:
O. Lehmann
per Mmm &c.
Attorneys.

UNITED STATES PATENT OFFICE.

OTTO LEHMANN, OF COLUMBUS CITY, IOWA.

IMPROVEMENT IN STEAMING APPARATUS.

Specification forming part of Letters Patent No. 113,068, dated March 28, 1871.

*To all whom it may concern:*

Be it known that I, OTTO LEHMANN, of Columbus City, in the county of Louisa and State of Iowa, have invented a new and useful Improvement in Steaming Apparatus; and I do hereby declare the following is a full, clear, and exact description thereof, which will enable others skilled in the art to make and use the same, reference being had to the accompanying drawing, forming part of this specification.

The object of this invention is to provide efficient and convenient means for generating steam for domestic purposes—for instance, for cooking feed for animals, steaming grain, heating water for washing, and other purposes; and it consists in a generator combined with a water-reservoir and furnace-base, arranged and operating as hereinafter more fully described.

The accompanying drawing represents a sectional elevation of the apparatus.

A is the generator, consisting of a fire-box, B, water-space D, and steam-space E. The generator is placed upon a base, F, which may be of any design or construction. The grate-bars are placed at the bottom of the fire-box. The fire-box is surrounded by the shell G, leaving an annular water-space, H, between the shell and the fire-box. I is the water-line. J is a water-reservoir, which is connected with the generator by the smoke-flue K, which passes up through the reservoir, and by the water-supply pipe L, which is attached to the bottom of the reservoir and the lower portion of the annular water-space. The reservoir is supported in an elevated position, as seen in the drawing, by the stand M, one or more of which stands may be employed. N is a cock in water-pipe L, which is opened and closed by a float, O, which rests on the surface of the water in the generator, and acts upon the lever P of the cock by means of the rod $q$, bar R, and rod S, the latter of which passes down through the stuffing-box T into the steam-space, as seen in the drawing. U is the pipe which conducts the steam into the vessel which contains the article to be cooked or steamed. V is a cock in this steam-pipe. Water may be heated in a barrel or other vessel by conducting the steam into it, or heated water may be drawn directly from the generator through the cock W. X is a small steam-chamber on the top of the generator, from which the steam is taken by the steam-pipe U. On this chamber there is a safety-valve, Y.

A certain amount of steam-pressure will be obtained in the generator under ordinary circumstances; but it is not designed to use steam in this apparatus under anything more than a very light and safe pressure.

Z is a try-cock, connecting with the water-space of the generator. Z' is the damper-handle, for regulating the draft of air into the fire-box. Y' is the opening through which the fuel is introduced into the fire-box.

By keeping a supply of water in the open reservoir J, it will be seen that the generator will be supplied, while the float (the rod of which should work easily through the stuffing-box) will regulate the quantity admitted.

It will be seen that by this arrangement the fuel is used to the best possible advantage. After generating the steam, the smoke and heated gases are passed through the reservoir and made to heat the water therein.

For the purposes for which this apparatus is intended the arrangement is convenient, safe, and economical.

Having thus described my invention, I claim as new and desire to secure by Letters Patent—

The combination of the base F, generator A, reservoir J, smoke-flue K, water-pipe L, cock N, and steam-pipe U, arranged and operating substantially as and for the purposes described.

OTTO LEHMANN.

Witnesses:
   J. W. GARNER,
   WM. H. NEAL.